United States Patent [19] … [11] Patent Number: 5,000,891
Green … [45] Date of Patent: Mar. 19, 1991

[54] EXPANDABLE POLYSTYRENE PELLETS

[76] Inventor: James R. Green, 3910 Wingren Rd., Irving, Tex. 75062

[21] Appl. No.: 912,335

[22] Filed: Sep. 29, 1986

[51] Int. Cl.⁵ .......................................... B29C 67/20
[52] U.S. Cl. ................................... 264/45.5; 264/53; 264/54; 264/143
[58] Field of Search .................. 264/45.5, 53, 51, 143, 264/DIG. 13, DIG. 5, 54

[56] References Cited

U.S. PATENT DOCUMENTS

| | | |
|---|---|---|
| 2,512,463 | 6/1950 | Maier . |
| 2,787,809 | 4/1957 | Stastny . |
| 3,011,217 | 12/1961 | Carlson, Jr. . |
| 3,015,851 | 1/1962 | Wiles . |
| 3,021,291 | 2/1962 | Thiesses . |
| 3,026,274 | 3/1962 | McMillan et al. . |
| 3,065,500 | 11/1962 | Berner . |
| 3,066,382 | 12/1962 | Zweigle . |
| 3,089,857 | 5/1963 | Pottenger ...................... 264/54 X |
| 3,251,728 | 5/1966 | Humbert . |
| 3,372,215 | 3/1968 | Muirhead et al. ................... 264/53 |
| 3,375,212 | 3/1968 | Bonner . |
| 3,400,037 | 9/1968 | Sare et al. . |
| 3,435,103 | 3/1969 | Medhurst ........................... 264/53 |
| 3,480,570 | 11/1969 | Roberts et al. . |
| 3,723,237 | 3/1973 | Fuss . |
| 3,723,240 | 3/1973 | Skochdopole et al. . |
| 3,856,904 | 12/1974 | Ayres . |
| 4,042,658 | 8/1977 | Collings . |
| 4,100,242 | 7/1978 | Leach . |
| 4,169,179 | 9/1979 | Bussey . |
| 4,424,287 | 1/1984 | Johnson et al. ..................... 264/50 |
| 4,655,840 | 4/1987 | Wittwer et al. ................. 106/127 X |

OTHER PUBLICATIONS

"Rigid Plastics Foams", T. H. Ferrigno, Reinhold Publishing Corporation, N.Y., N.Y., (1963) pp. 148–153.

*Primary Examiner*—David Simmons
*Assistant Examiner*—Allan R. Kuhns
*Attorney, Agent, or Firm*—Johnson & Gibbs

[57] ABSTRACT

A process for manufacturing expandable polystyrene pellets having a bulk density of about 36 lbs/cubic foot which upon expansion results in expanded articles having a bulk density of about 0.8 lbs/cubic foot and having substantiallly uniform cell formation is an interior portion thereof. The process for manufacturing the pellets includes the steps of: (a) mixing virgin polystyrene beads having a molecular weight of less than about 200,000 with an effective minor amount of a nucleating agent to provide an extrusion mixture; (b) introducing the extrusion mixture into an extruder and extruding a heat plasticized mass to form an unexpanded extrudate in filamentary form; (c) drawing the extrudate to provide a drawn extrudate having a substantially continuous, gas impervious skin (d) immediately cooling the drawn extrudate to a temperature below the vaporization temperature of the vaporizable expanding agents; (e) cutting the cooled drawn extrudate into pellets; and (f) aging the pellets by exposure of the pellets to ambient atmospheric conditions.

19 Claims, 1 Drawing Sheet

FIG. 3
FIG. 2
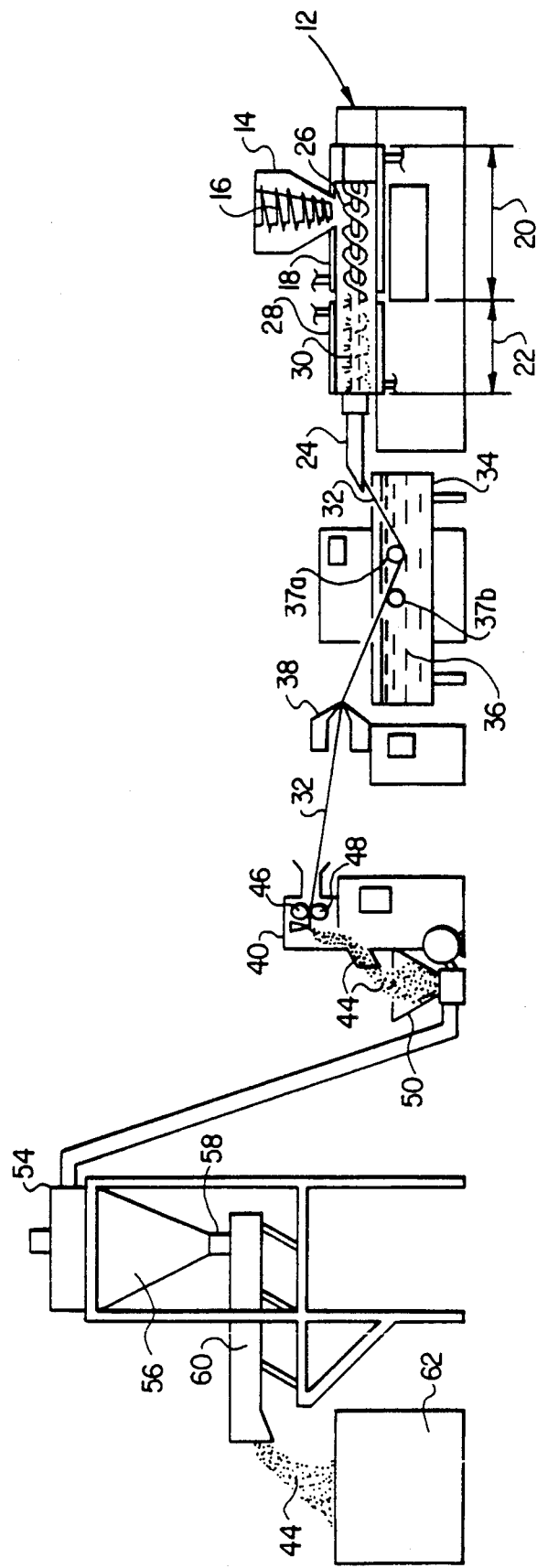
FIG. 1

EXPANDABLE POLYSTYRENE PELLETS

BACKGROUND OF THE INVENTION

This invention relates to the manufacture of expandable configured polystyrene pellets, and more particularly but not by way of limitation, to a method for manufacturing expandable polystyrene pellets from polystyrene beads obtained from a suspension polymerization process wherein the polystyrene beads contain a vaporizable expanding agent.

BRIEF DESCRIPTION OF THE PRIOR ART

Thermoplastic polymeric materials, such as polystyrene, containing vaporizable agents are known to be expandable by application of heat under conditions which permit the vaporizable agent to vaporize and form large numbers of cells within the polymeric material. One method for producing expandable polymeric particles is disclosed in U.S. Pat. No. 3,372,215 issued to Muirhead et al. In the production of expandable polymer particles as disclosed in Muirhead et al., a vaporizable expanding agent, such as pentane, is incorporated into a heat plasticized mass of the polymer within the extruder. The heat plasticized polymer containing the expanding agent is thereafter extruded in filamentary form into an atmospheric or substantially subatmospheric environment, and immediately cooled by contacting the extrudate with a fluid at a temperature between 60° C. and 80° C. under conditions such that the temperature of the extrudate does not fall below 60° C. during a normalizing period (i.e. the minimum length of time for which the extruded polymer in filamentary or particulate form must be maintained at a temperature within the range of from 60° C. to 80° C. and at normal pressure prior to being cooled to ambient temperature in order that the diameter of at least 90% of the cells of an expanded particle, obtained by freely expanding the expandable particle by application of heat under conditions to achieve a maximum volume increase of the particle, is not greater than 100 microns. Subsequent to the normalization period, the extruded polymer is cooled to ambient temperature. Further, the filamentary extrudate can be cut into particles either prior to or after the normalizing period.

Another prior art method for making articles of extrudable thermoplastic polymers is disclosed in U.S. Pat. No. 3,400,037 issued to Sare et al. The Sare et al. reference discloses a method for producing an expanded plastic article from an extrudable, expandable, synthetic plastic material wherein the molten mass is extruded under pressure through a die orifice to an atmosphere of lower pressure so as to initially expand the extruded filament to a rod form of larger cross-sectional dimension; and thereafter the expanded rod is cut to form a multiplicity of flat, thin waffers, each of which has a cross-sectional thickness substantially less than its peripheral dimensions. The thin waffers are then subjected to the action of steam at elevated temperatures for a time sufficient to effect warping of the waffers to a shape having curvilinear top and bottom surfaces and a cross-sectional thickness substantially less than their peripheral dimensions.

Thus, it is known that thermoplastic organic polymers, such as polystyrene, can be expanded to a cellular form by intimately incorporating a vaporizable expanding agent in the polymer and thereafter heating the polymer under conditions permitting the expanding agent to vaporize and form a large number of individual, enclosed cells within the polymer.

In addition, expandable polystyrene beads obtained by a suspension polymerization process and having incorporated therein a vaporizable expanding agent, such as pentane, have heretofore been known. Generally, however, when employing expandable polystyrene beads to form articles, the beads are injected directly into a mold and expanded under elevated temperature and pressure conditions so that the beads are fused together to produce the desired article.

Problems have nevertheless been encountered in the use of polystyrene in the production of article of manufacture in that special steps have heretofore been required to prevent premature expansion of the polystyrene extrudate containing a vaporizable expanding agent. Thus, while the prior art methods have heretofore been acceptable in the manufacture of expandable particles of polystyrene, such prior art methods have generally required the use of exotic techniques to prevent undesired, premature expansion of the extrudate due to the pressure drop encountered at the die head. The use of such exotic techniques and equipment is not only costly, but often times does not produce expanded articles having a desired cell structure. That is, for an article to be acceptable it must have a desired strength and density, and such is related to the cell structure of the article, as well as the uniformity of the cell structure formed in the expanded article as a result of the processing techniques employed in the extrusion of the polymeric material. Thus, it would be highly desirable if one could develop a process for manufacturing polystyrene pellets which, upon subsequent heating of the pellet under conditions of maximum volume increase of the pellet, provided expanded particles having a relatively low bulk density, while maintaining substantially uniform minute cell structure throughout an interior portion of the expanded article.

SUMMARY OF THE INVENTION

According to the present invention an improved process for manufacturing expandable polystyrene pellets is provided which does not require exotic equipment to prevent the premature expansion of the an extrudate, or extensive periods of time to normalize the extrudate prior to completing the manufacture of the pellets. The expandable polystyrene pellets produced in accordance with the process of the present invention are characterized as having a substantially continuous, gases impervious skin integral with and covering an interior portion. The interior portion of the pellets contains a vaporizable expanding agent substantially uniformly dispersed therein, and the pellets have a bulk density of about 32 lbs/cubic ft. Upon expansion of the pellets by application of heat under conditions of maximum volume increase of the pellets, the resulting expanded articles have a bulk density of about 0.8 lbs/cubic ft; and the expanded articles are provided with an outer skin portion integral with and covering an interior cellular portion. The interior cellular portion of the expanded articles contains substantially uniform cells dispersed throughout, and substantially all of the cells have a cell diameter of less than about 40 microns. The material is capable of expanding to lower densities with excellent resiliency and structural integrity.

Broadly, the process for manufacturing expandable polystyrene pellets having the before-described properties comprises: (a) mixing virgin polystyrene beads having a melt index of 4.5–5.0 and molecular weight of less than about 200,000 with an effective minor amount of a nucleating agent to provide an extrusion mixture, the polystyrene beads containing from about 5.9 weight percent pentane to about 7.5 weight percent of a vaporizable expanding agent compatible with the polystyrene; (b) introducing the extrusion mixture into an extruder and extruding a heat plasticized mass at a temperature of from about 115° C. to about 125° C. and at a pressure from about 1800 psi to about 2200 psi to form an unexpanded extrudate in filamentary form; (c) drawing the extrudate at a rate greater than the rate of extrusion to provide a drawn extrudate having a substantially continuous, gas impervious skin integral with and covering an interior portion of the extrudate; (d) immediately cooling the drawn extrudate to a temperature below the vaporization temperature of the vaporizable expanding agents; (e) cutting the cooled drawn extrudate into pellets; and (f) aging the pellets by exposure of the pellets to ambient atmospheric conditions for a period of time effective to permit substantially uniform dispersement of the vaporizable expanding agent throughout the interior portion of the pellets. The pellets so produced are characterized as having a bulk density of about 32 lbs/cubic ft, and the pellets, upon heating under conditions of maximum volume increase of the pellets, provide expanded particles having a bulk density of about 0.8 lbs/cubic ft, and having a cell structure of less than about 40 microns in cell diameter.

An object of the present invention is to provide improved expandable polystyrene pellets which, upon heating under conditions of maximum volume increase of the pellets, results in expanded polystyrene articles having substantially uniform minute cell structures.

Another object of the present invention, while achieving the before stated object, is to provide an improved process for the manufacture of expandable polystyrene pellets.

Another object of the present invention, while achieving the before stated objects, is to provide an improved process for the manufacture of expandable polystyrene pellets which does not suffer from the deficiencies of the prior art methods, and the requirements of such methods to prevent premature expansion of the extrudate.

Other object, advantages and features of the present invention will become apparent to those skilled in the art from a reading of the following description when read in conjunction with the drawings and the appended claims.

BRIEF DESCRIPTION OF THE DRAWINGS

FIG. 1 is a diagrammatic illustration of an apparatus suitable for manufacturing expandable polystyrene pellets in accordance with the present invention.

FIG. 2 is an enlarged, partially cutaway enlarged pictorial representation of an expandable polystyrene pellet prepared in accordance with the present invention, such representation being four times larger in size than pellets actually produced.

FIG. 3 is an enlarged, partially cutaway enlarged pictorial representation of an expanded particle resulting from the heating of the pellet of FIG. 2 under condition of maximum volume increase, such representation being two times larger in size than expanded articles produced by expansion of the pellets.

DESCRIPTION OF THE PREFERRED EMBODIMENT

In practicing the process for manufacturing expandable polystyrene pellets in accordance with the present invention the appropriate raw materials are selected and mechanically mixed in the required amounts to form an extrusion mixture. It should be noted that the selection of the ingredients, as well as their preparation in the formation of the extrusion mixture, appears to be critical if one is to obtain the desired expandable polystyrene pellets utilizing the process for manufacture of same wherein the pellets so produced have a bulk density of about 32 lbs/cubic ft; and such pellets are expandable, by heating under conditions of maximum volume increase of the pellets, to expanded particles having a bulk density of about 0.8 lbs/cubic ft and having substantially uniform cell formation within the interior portion of the expanded article in which the cells have a cell diameter of less than about 40 microns.

Further, the expandable polystyrene pellets of the present invention are prepared not only by a unique combination of raw materials, but also by a unique combination of processing conditions and processing steps. Thus, the initial step in manufacturing the expandable polystyrene pellets of the present invention involves the preparation of an extrusion mixture. The extrusion mixture consists of virgin polystyrene beads having a molecular weight of less than about 200,000 which are impregnated with from about 5 to 7.5 weight percent of a vaporizable expanding agent compatible with the polystyrene, and an effective minor amount of a nucleating agent for generating carbon dioxide under extrusion conditions.

The term "virgin" polystyrene beads as used herein is to be understood to mean polystyrene beads obtained by a suspension polymerization process wherein the only modification of the beads so produced is the incorporation of from about 5 to 7.5 weight percent of the vaporizable expanding agent compatible with the polystyrene. That is, the polystyrene beads do not contain any additional components or covering materials such as lubricants, anti-clumping agents, anti-static agents, and the like.

The vaporizable expanding agents incorporated into the polystyrene beads for use in the practice of the present invention can be any normally liquid organic substance which is soluble in the polystyrene and capable of expanding the polystyrene upon application of heat, but such substance must not have any solvent action on the polystyrene (that is, the substance must not be capable of dissolving the polystyrene). Generally, the vaporizable expanding agent is an organic liquid boiling, at atmospheric pressure, between about 25° C. and about 80° C. Typical of such vaporizable expanding agents are the saturated aliphatic hydrocarbons and mixture thereof, such as n-pentane, iso-pentane, n-butane and the like.

The nucleating agent, which is generally in solid form at room temperature, is comminuted by any suitable means, such as with a mortar and pestle, prior to mixing with the virgin polystyrene beads to insure that large particles or clumps of the nucleating agent are pulverized to a finely divided powder. While any suitable nucleating agent capable of producing carbon dioxide under the extrusion conditions hereinafter set forth, and which is compatible with the virgin polystyrene beads, can be employed in the process for manufacturing expandable polystyrene pellets of the present invention, desirable results have been obtained wherein the nucleating agent is selected from the group consisting of amorphous calcium polysilicate and a mixture of citric acid and sodium carbonate (such mixture being a commercially available product sold under the trademark "HYDROCEROL").

The effective minor amount of the nucleating agent mixed with virgin polystyrene beads in formulating the extrusion mixture can vary widely, but generally will be an amount effective to provide from about 0.4 to 0.25 grams of the nucleating agent per kilogram of the polystyrene beads. Further, any suitable means can be employed to effect the mixing of the nucleating agent with the polystyrene beads. Typical equipment which can be used to mechanically mix the polystyrene beads and the nucleating agents are rolling drums, blenders and the like.

Once the extrusion mixture has been formed, that is, the desired amount of the nucleating agent has been substantially uniformly distributed throughout the polystyrene beads, the extrusion mixture is introduced into an extruder capable of extruding a heat plasticized mass at a temperature from about 115° C. to about 125° C. and at a pressure from about 1800 psi to about 2200 psi to form an unexpanded extrudate in filamentary form. The extrudate is subjected to drawdown at a rate greater than the rate of extrusion to provide a drawn extrudate having a substantially continuous, gas impervious skin integral with and covering an interior portion of the extrudate. The drawn extrudate is immediately cooled to a temperature below the vaporization temperature of the vaporizable expanding agent employed in the extrusion mixture which is contained within the interior portion of the drawn extrudate. Thereafter, the cooled, drawn extrudate is cut into pellets and the pellets are conditioned, by exposing the pellets to ambient atmospheric conditions, for a period of time effective to permit substantially uniform dispersement of the vaporizable expanding agent throughout the interior portion of the pellets.

Referring now to FIG. 1, a detailed description of the over all process for manufacturing expandable polystyrene pellets in accordance with the present invention will be described. The extrusion mixture is fed into an extruder 12 via a hopper 14. Because the extrusion mixture contains polystyrene beads having a substantially spherical configuration, it is desirable that the hopper 14 be provided with a crammer 16 (illustrated as a screw conveyor) so that a substantially constant feed rate of the extrusion mixture (based upon the rate of extrusion) can be fed to the extruder 12 via the hopper 14. The extruder 12, a typical screw extruder having a heating jacket 18 extending over part of its length, is characterized as having a heat plasticizing zone 20, a cooling zone 22, and a die head 24. An extruder screw 26 extends throughout the heat plasticized zone 20 and the cooling zone 22 for advancing the heat plasticized extrusion mixture under extrusion pressure towards the extruder die head 24. A cooling jacket 28 surrounds the cooling zone 22 of the extruder 12, and the portion of the extruder screw 26 disposed within the cooling zone 22 is provided with a plurality of pin elements 30 for fractionating the heat plasticized mass in the cooling zone 22, and thus increase the viscosity of the heat plasticized mass so as to prevent undesired expansion of the extrudate.

The extrusion mixture is heated in the heat plasticizing zone 20 of the extruder 12 to a temperature from about 115° C. to about 130° C. so as to produce a heat plasticized mass. The heat plasticized mass is then advanced from the heat plasticizing zone 20 to the cooling zone 22 wherein the heat plasticized mass is cooled to a temperature of from about 80° C. to about 100° C.. The cooling of the heat plasticized mass within the desired range permits one to maintain the mass as an extrudable mass, while substantially increasing the viscosity of the plasticized mass. The cooled heat plasticized mass is thereafter advanced by the extruder screw 26 to the die head 24 of the extruder 12 wherein the plasticized mass is extruded into an atmospheric environment as filaments or strands 32 through a plurality of orifices (not shown) in the die head 24. Only one extrudate in filamentary form is illustrated in FIG. 1 for simplicity. The die head 24 of the extruder is heated so that the plasticized mass is extruded therethrough at a temperature of from about 115° C. to about 125° C. and the extrusion pressure is in the range from about 1800 psi to about 2200 psi.

The extrudate 32 extruded through the orifices (not shown) in the die head 24 is drawn away from the heated die head 24 into the air and above a cooling bath 34 containing a cooling fluid 36 as shown in FIG. 1 at a rate of from 1.5 to about 2 times greater than the rate of extrusion to provide a drawn extrudate having a substantially continuous gas impervious skin integral with and covering an interior portion of the drawn extrudate. The drawn extrudate is then immediately passed through a cooling bath 34 containing a cooling fluid 36, such as water. The cooling fluid 36 is maintained at a temperature from about 15° C. to about 30° C.. The drawn extrudate is continuously passed through the cooling fluid 36 (and maintained in contact with the cooling fluid 36 by passing the drawn extrudate under a first roller 37a and then over a second roller 37b as illustrated) so that at least the skin portion of the extrudate 32 is cooled to a temperature of less than the vaporization temperature of the vaporizable expanding agent dispersed within the extrudate 32. It should be understood that the period of time that the drawn extrudate remains in contact with the cooling fluid 36 in the cooling bath 34 will be determined upon the length of the cooling bath 34, the rate of extrusion, and the degree of drawdown on the extrudate. However, it has been found that under normal operating conditions wherein the plasticized mass is extruded at a temperature from about 115° C. to about 125° C. and at a pressure from about 1800 psi to about 2200 psi, and the degree of drawdown is at a rate from about 1.5 to about 2 times greater than the rate of extrusion of the plasticized mass through the die head 24, the contact time between the drawn extrudate and the cooling fluid 36 to effectively cool at least the surface of the drawn extrudate to below the vaporization temperature of the vaporizable expanding agent (and thus prevent undesired expansion of the extrudate) is from about 1 to about 30 seconds.

The cooled extrudate is then passed through an air knife wherein residual cooling fluid, such as water, is removed from the surface of the cooled extrudate. From the air knife 24 the extrudate 32 is passed to a conventional pelletizer 40 having a rotary cutter 42 wherein the extrudate 32 is cut into pellets 44. The pelletizer 40 is further provided with pinch rollers 46, 48 for frictionally engaging the extrudate 32 and providing the desired degree of drawdown on the extrudate.

Thus, as will be readily apparent to those skilled in the art, the degree of drawdown of the extrudate will vary depending upon the rate of rotation and size of the pinch rollers 46 & 48, and the rate of extrusion of the plasticized mass from the die head 24.

The pellets 44 produced by cutting the extrudate 32 with the pelletizer 40 have a bulk density of approximately 36 lbs/cubic ft. In order to separate fines and particulate matter generated by the cutting action of the rotary cutter 42 of the pelletizer 40 on the extrudate 32 the pellets 44 are discharged from the pelletizer 40 into a hopper 50 wherein the pellets 44 are airveyed through a conduit 52 to an upper portion 54 of a cyclone apparatus 56. The pellets 44 are spirally conveyed downwardly through the cyclone apparatus 56 and cooled to a temperature of less than about 30° C. by the cooling action of ambient air within the cyclone apparatus 56. The cool pellets 44 are then discharged from a lower portion 58 of the cyclone apparatus 56 onto a shaker 60 wherein the particulate matter and fines generated during the cutting of the extrudate 32 by the pelletizer 40 are separated from the dryed, cooled pellets 44. The pellets 44 are thereafter discharged from the shaker into storage bins (such as storage bin 62) wherein the pellets 44 are exposed to atmospheric conditions for a period of at least about two hours to permit the vaporizable expanding agent to uniformly disperse through the interior portion of the pellet and provide an expandable pellet. Which, upon expanding under conditions of maximum volume increase of the pellet, results in expanded particles having a bulk density of approximately 0.8 lbs/cubic ft. and substantially uniform minute cells having a cell diameter of less than about 40 microns formed throughout an interior portion of the expanded particles.

An enlarged pictorial representation of the pellet 44 having a bulk density of about 36 lbs/cubic foot produced as described herein before is set forth in FIG. 2. The pictorial representation is an enlargement of four times the size of the actual pellet produced. As illustrated, the pellet 44 is a cylindrically shaped pellet having a substantially continuous, gas impervious skin 64 integral with and covering an interior portion 66 of the pellet 44. The interior portion 66 of the pellet 44, after proper conditioning for at least about 2 hours, has the vaporizable expanding agent substantially uniformly dispersed therein.

FIG. 3 is an enlarged pictorial representation of an expanded particle 68 resulting from heating the pellet 44 of FIG. 2 under conditions of maximum volume increase of the pellet 44. The pictorial representation is an enlargement of two times the size of the actual particle produced. As illustrated, the expanded particle 68 is provided with a substantially cylindrical configuration having a continuous skin 70 integral with and covering an interior cellular portion 72. The continuous skin 70 is substantially gas impervious; whereas the interior cellular portion 72 is substantially uniform and contains minute cells having a cell diameter of less than about 40 microns. Further, the expanded particles, such as expanded particle 68, have a bulk density of approximately 0.8 lbs/cubic foot. Thus, the expanded particles have improved cushioning properties, improved strength characteristics and are useful as loose fill packing materials for the shipping and storage of breakable items.

In producing the expandable polystyrene pellets in accordance with the process of the present invention, it is believed that the molecular weight of the virgin polystyrene beads employed in formulating the extrusion mixture is critical, as well as are the process steps and the operating conditions of the extruder if one is to produce an unexpanded extrudate which can be cut into expanded pellets having the before-mentioned properties.

To assist in the understanding of the present invention the following examples are set forth. However, it is to be understood that the examples are for illustrative purposes only and are not intended to unduly limit of the subject invention as defined in the appended claims.

EXAMPLE 1

Expandable polystyrene pellets were manufactured employing the process described above with reference to FIG. 1. The extrusion mixture was formulated by mixing virgin polystyrene beads having a molecular weight of from about 150,000 to about 175,000 (marketed by BASF Corporation as BF-420) with about 0.8 grams of amorphous calcium polysilicate nucleating agent per kilogram of polystyrene beads. The virgin polystyrene beads contained about 6 weight percent pentane as the vaporizable expanding agent, and the pentane was incorporated into the polystyrene beads during production of same.

The extrusion mixture was then introduced into an extruder equipped with a crammer in the hopper to insure a substantially constant feed rate of the extrusion mixture into the extruder. The extrusion mixture was heated to form a heat plasticized mass in the melt zone of the extruder. The temperature of the heat plasticized mass in the melt zone of the extruder was controlled at about 120° C., and the extruder was operated at an extrusion pressure of about 2000 psi. The heat plasticized mass was sequentially advanced from the melt zone through the cooling zone of the extruder wherein the heat plasticized mass was cooled to a temperature of about 87° C., and from the cooling zone to the die head of the extruder which was operated at a temperature of about 120° C..

The extrudate from the die head was a plurality of strands in a filamentary form, and the strands were drawn at a rate of about 1.8 times greater than the rate of extrusion to produce a drawn extrudate. The drawn extrudate was immediately immersed in a water bath in which the water was maintained at a temperature of about 22° C. The extrudate was continuously drawn through the water such that contact of the extrudate with the water was maintained for a period of about 7 seconds.

The cooled extrudate was then passed through an air knife where residual water was removed therefrom, and the dried extrudate was then passed to a pelletizer wherein the extrudate was cut into pellets.

Because of the cutting action of the pelletizer on the cooled, drawn extrudate fines and other particulate materials were produced. Thus, the pellets were discharged from the pelletizer into a hopper wherein the pellets were airveyed to an upper portion of a cyclone operated at ambient temperatures. The pellets were spiraled downwardly through the cyclone and discharged from a lower portion of the cyclone onto a shaker wherein the particulate materials were separated from the pellets. Movement of the pellets through the cyclone achieved cooling of the pellets to a temperature of about 22° C.

The pellets were discharged from the shaker into storage bins and exposed to atmospheric conditions to permit substantial uniform dispersement of the vaporizable expanding agent (i.e. pentane) throughout the interior portion of the pellets. A portion of the pellets were subjected to heat to permit maximum volume expansion of the pellets after selected time intervals of exposing the pellets to atmospheric conditions to determine the effect, if any, that the aging period had on the formation of cells in the expanded articles produced from the pellets. The following table sets forth the time of conditioning, and the results of the expanded articles resulting from the pellets for each of the conditioning periods.

TABLE

| Conditioning Time | Cell Formation |
| --- | --- |
| 1.5 hours | Expanded articles produced by expansion of pellets contained non-uniform cell structure. |
| 5.5 hours | Expanded articles produced by expansion of the pellets had a substantially uniform cell structure and the cells had a cell diameter of less than about 40 microns. |
| 7.5 hours | Expanded articles produced by expansion of the pellets had a substantially uniform cell structure and the cells had a cell diameter of less than about 40 microns. |
| 16 hours | Expanded articles produced by expansion of the pellets had a substantially uniform cell structure and the cells had a cell diameter of less than about 40 microns. |
| 28 hours | Expanded articles produced by expansion of the pellets had a substantially uniform cell structure and the cells had a cell diameter of less than about 40 microns. |

EXAMPLE 2

An experiment was conducted utilizing the same procedure of Example 1 with the exception that polystyrene beads had a molecular weight of 240,000 and were coated with a metallic stearate anti-clumping agent. In extruding the extrusion mixture the melt zone of the extruder was operated at 120° C., the cooling zone was operated at 87° C. and the die head temperature was maintained at 120° C.. Further, the extrusion pressure was maintained at 2000 psi. The extrudate was subjected to a drawdown of about 1.8 times greater than the rate of extrusion. However, when employing a extrusion mixture containing polystyrene beads having a molecular weight of about 240,000 and containing a metallic stearate anticlumping agent the resulting pellets, upon subsequent expansion produced an article having a cell size of at least about 200 microns in diameter or larger. Thus, it becomes readily apparent that in practicing the present invention that the molecular weight of the polystyrene beads of the extrusion mixture are critical and must be maintained within a range of less than about 200,000 in order to obtain the desired expandable polystyrene pellets.

EXAMPLE 3

An experiment was conducted utilizing the same procedure and operating conditions of Example 1 with the exception that the polystyrene beads were coated with a metallic stearate anti-clumping agent (i.e. the polystyrene beads had the same molecular weight as those used in Example 1 but the polystyrene beads in this example were not virgin polystyrene beads as herein defined). The pellets were conditioned for a period of at least about 2 hours to permit the vaporizable expanding agent to be dispersed substantially uniformly throughout the interior portion of the pellets. The conditioned pellets were then subjected to heat expansion to permit maximum volume expansion of the pellets. While the cell structure of the expanded pellets appeared to be substantially uniform, the cell diameter of the cells were at least about 75 microns.

The above examples clearly illustrate the criticality of the composition of the extrusion mixture, as well as the operating conditions and steps employed in producing the expandable pellet from polystyrene beads of the present invention. Thus, it is clear that the present invention is well adapted to carry out the objects and to obtain the ends and advantages mentioned herein as well as those inherent in the invention. While a presently preferred embodiment of the invention has been described for purposes of this disclosure, it will be understood that numerous changes may be made which will readily suggest themselves to those skilled in the art and which are accomplished within the spirit of the invention disclosed and as defined in the appended claims.

What is claimed is:

1. A process for manufacturing expandable polystyrene pellets comprising:
   (a) admixing at a temperature of from about 100° C. to about 140° C. virgin polystyrene beads having a molecular weight of less than about 200,000 and having a melt index from about 4.5 to about 5.0 with an effective minor amount of a nucleating agent for generating carbon dioxide under extrusion conditions to provide an extrusion mixture, said virgin polystyrene beads containing from about 5.9 to about 7.5 weight percent of a vaporizable expanding agent compatible with the polystyrene;
   (b) cooling said extrusion mixture to a temperature of from about 80° C. to about 100° C. so as to increase the viscosity of the extrusion mixture;
   (c) introducing the extrusion mixture into an extruder and extruding at heat plasticized mass at a temperature of from about 115° C. to about 125° C. and at a pressure of from about 1800 psi to about 2200 psi to form an unexpanded extrudate in a filamentary form;
   (d) drawing the extrudate away from said extruder at said temperature of from about 115° C. to about 125° C. and at said pressure of from about 1800 psi to about 2200 psi into the air at a rate of from about 1.5 to about 2 times greater than the rate of extrusion to provide a drawn extrudate having a substantially continuous, gas impervious skin integral with and covering an interior portion of the extrudate;
   (e) immediately cooling at least the surface of the drawn extrudate to a temperature below the vaporization temperature of the vaporizable expanding agent;
   (f) cutting said drawn extrudate into pellets;
   (g) cooling the pellets to about ambient room temperature; and (h) aging, under atmospheric pressure and ambient room temperature, the pellets by exposing the pellets to ambient atmospheric conditions for a period of time effective to provide substantially uniform dispersement of the vaporizable expanding agent throughout the interior portion of the pellets.

2. The process for manufacturing expandable polystyrene pellets of claim 1 wherein the effective minor amount of the nucleating agent admixed with the polystyrene beads is an amount of from about 0.4 to about 0.25 grams of nucleating agent per kilogram of polystyrene beads.

3. The process for manufacturing expandable polystyrene pellets of claim 2 wherein the nucleating agent is comminuted prior to mixing with the polystyrene beads.

4. The process for manufacturing expandable polystyrene pellets of claim 3 wherein the nucleating agent is selecting from the group consisting of amorphous calcium polysilicate and a mixture of citric acid and sodium carbonate.

5. The process of manufacturing expandable polystyrene pellets of claim 1 wherein the vaporizable expanding agent is an aliphatic hydrocarbon.

6. The process of manufacturing expandable polystyrene pellets of claim 5 wherein the vaporizable expanding agent is an aliphatic hydrocarbon selected from the group consisting of n-pentane, iso-pentane and mixtures thereof.

7. The process of manufacturing expandable polystyrene pellets of claim 1 wherein the cooling of the drawn extrudate comprises contacting the drawn extrudate with a cooling liquid maintained at a temperature of from about 15° C. to about 30° C. for a period of time of from about 1 to 30 seconds.

8. The process for manufacturing expandable polystyrene pellets of claim 7 wherein the cooling liquid is water, and the drawn extrudate is passed through a vessel containing said water.

9. The process for manufacturing expandable polystyrene pellets of claim 8 further comprising drying the cooled drawn extrudate to remove residual water therefrom prior to cutting the drawn extrudate into pellets.

10. The process of manufacturing expandable polystyrene pellets of claim 1 further comprising passing the pellets through a cyclone apparatus operated at ambient temperature so as to cool the pellets to a temperature of less than about 30° C., and separating the cooled pellets from fines produced during the cutting of the extrudate into the pellets prior to aging the pellets by exposure to ambient atmospheric conditions.

11. The process for manufacturing expandable polystyrene pellets of claim 10 wherein the period of time effective to achieve substantial uniform dispersement of the vaporizable expanding agent throughout the interior portion of the pellets is greater than about 1.5 hours.

12. The process for manufacturing expandable polystyrene pellets of claim 1 wherein extrusion mixture is extruded through a screw-type extruder characterized as having a melt zone, a cooling zone, and a die head, in the melt zone the extrusion mixture being heated to a temperature of from about 115° C. to about 130° C. so as to form the heat plasticized mass, in the cooling zone the heat plasticized mass being cooled to a temperature of from about 80° C. to about 100° C. to reduce the viscosity of the heat plasticized mass prior to extruding same through the die head of the extruder.

13. The process for manufacturing expandable polystyrene pellets of claim 12 wherein the virgin polystyrene beads employed to form the extrusion mixture have a molecular weight of from about 90,000 to about 150,000.

14. The process of manufacturing expandable polystyrene pellets of claim 1 wherein the aging of the pellets by exposure to ambient atmospheric condition is for a period of time of at least about 2 hours, and said pellets are characterized as having a bulk density of about 36 pounds per cubic foot, and said pellets, upon heating under condition of maximum volume increase of the pellets, provide expanded particles having a bulk density of about 0.8 pounds per cubic foot, said particles having a substantially gas impervious skin integral with and covering an interior portion of the particle, said interior portion containing substantially uniform cells of having a cell diameter of less than about 40 microns.

15. A process for manufacturing expandable polystyrene pellets comprising:
(a) admixing virgin polystyrene beads impregnated with from about 5.9 to about 7.5 weight percent of a vaporizable expanding agent and having a melt index from about 4.5 to 5.0 with from about 0.4 to about 0.25 grams of a nucleating agent per kilogram of polystyrene beads to form an extrusion mixture, said polystyrene beads having a molecule weight within the range of from about 90,000 to about 150,000;
(b) introducing the extrusion mixture into an extruder, said extruder characterized as having a melt zone, a cooling zone, a die head and an extruder screw for advancing the extrusion mixture under extrusion pressure towards the die head;
(c) heating the extrusion mixture in the melt zone of the extruder to a temperature of from about 115° C. to about 130° C. so as to produce a heat plasticized mass;
(d) cooling the heat plasticized mass in the cooling zone of the extruder to a temperature of from about 80° C. to about 100° C. so as to increase the viscosity of the plasticized mass;
(e) extruding the cooled plasticized mass into an atmospheric environment through the die head of the extruder at a temperature of from about 115° C. to about 125° C. and at a pressure of from about 1800 psi to about 2200 psi to form an unexpanded extrudate in filamentary form;
(f) drawing the extrudate away from said extruder at said temperature of from about 115° C. to about 125° C. and at said pressure of from about 1800 psi to about 2200 psi into the air at a rate of from about 1.5 to about 2.0 times greater than the rate of extrusion to provide a drawn extrudate having a substantially continuous gas impervious skin integral with and covering an interior portion of the drawn extrudate;
(g) immediately passing the drawn extrudate through a cooling bath containing a cooling fluid maintained at a temperature of from about 15° C. to about 30° C. such that the drawn extrudate is contacted with the cooling fluid for a period of time of from about 1 to about 30 seconds;
(h) drying the drawn extrudate to remove residual cooling fluid therefrom;
(i) cutting the dried, drawn extrudate into pellets, said pellets having a bulk density of approximately 36 pounds per cubic foot;

(j) airveying the pellets to an upper portion of a cyclone apparatus so the pellets are spirally conveyed downwardly through the cyclone apparatus and cooled to a temperature of less than about 30° C.;

(k) discharging the cooled pellets from the cyclone apparatus onto a shaker for removal of particles of matter generated during the cutting of the extrudate into pellets; and (l) discharging the pellets from the shaker into storage bins wherein the pellets are exposed to atmospheric pressure and ambient room temperature for a period of time of at least about 2 hours to permit the vaporizable expanding agent to uniformly disperse through the interior portion of the pellets and provide expandable pellets, said pellets having a bulk density of approximately 36 pounds per cubic foot and expandable upon heating under conditions of maximum volume increase of the pellets so as to provide expanded particles having a bulk density of approximately 0.8 pounds per cubic foot and substantially uniform minute cells having a cell diameter of less than 40 microns formed through an interior portion of the expanded particles.

16. The process for manufacturing expandable polystyrene pellets of claim 15 wherein the cooling fluid is water and said drawn extrudate is cooled by passing same through a vessel containing said water.

17. The process of manufacturing expandable polystyrene pellets of claim 15 wherein the vaporizable expanding agent is an aliphatic hydrocarbon.

18. The process of manufacturing expandable polystyrene pellets of claim 15 wherein the aliphatic hydrocarbon is selected from the group consisting of n-pentane, iso-pentane and mixtures thereof.

19. The process of manufacturing expandable polystyrene pellets of claim 15 wherein the nucleating agent is selected from the group consisting of amorphous calcium polysilicate and a mixture of citric acid and sodium carbonate.

* * * * *